(12) United States Patent
Stoud et al.

(10) Patent No.: US 11,412,886 B2
(45) Date of Patent: Aug. 16, 2022

(54) BOTTLE SLEEVE WARMER APPARATUS

(71) Applicants: Jenny Stoud, Hilton Head Island, SC (US); Marguerite Rogers, Hilton Head Island, SC (US)

(72) Inventors: Jenny Stoud, Hilton Head Island, SC (US); Marguerite Rogers, Hilton Head Island, SC (US)

( * ) Notice: Subject to any disclaimer, the term of this patent is extended or adjusted under 35 U.S.C. 154(b) by 686 days.

(21) Appl. No.: 16/260,250

(22) Filed: Jan. 29, 2019

(65) Prior Publication Data

US 2020/0237142 A1    Jul. 30, 2020

(51) Int. Cl.
| | | |
|---|---|---|
| *A47J 36/26* | (2006.01) | |
| *A47J 36/24* | (2006.01) | |
| *H05B 3/34* | (2006.01) | |
| *H05B 1/02* | (2006.01) | |
| *A47J 36/04* | (2006.01) | |

(52) U.S. Cl.
CPC ....... *A47J 36/2433* (2013.01); *A47J 36/2411* (2013.01); *H05B 3/34* (2013.01); *A47J 36/04* (2013.01); *H05B 1/02* (2013.01)

(58) Field of Classification Search
None
See application file for complete search history.

(56) References Cited

U.S. PATENT DOCUMENTS

| | | | |
|---|---|---|---|
| 5,129,033 A | 7/1992 | Ferrara | |
| 5,436,429 A | 7/1995 | Cline | |
| 6,353,211 B1 | 3/2002 | Chen | |
| 6,703,590 B1* | 3/2004 | Holley, Jr. | A47J 36/2433 126/265 |
| 6,870,135 B2 | 3/2005 | Hamm | |
| 6,921,880 B2 | 7/2005 | Berger | |
| 9,364,806 B2* | 6/2016 | King | A47J 36/2411 |
| D801,496 S | 10/2017 | Letham | |
| 2009/0053672 A1 | 2/2009 | Cornelius | |
| 2010/0000980 A1* | 1/2010 | Popescu | A47J 36/2466 219/201 |
| 2012/0193347 A1* | 8/2012 | Schwartz | F24V 30/00 219/482 |
| 2015/0096972 A1* | 4/2015 | Glucksman | A47G 19/2288 219/442 |
| 2015/0208858 A1* | 7/2015 | Robbins | A47J 27/002 426/231 |

(Continued)

FOREIGN PATENT DOCUMENTS

WO    WO2004091471    10/2004

*Primary Examiner* — Joseph M. Pelham

(57) ABSTRACT

A bottle sleeve warmer apparatus for conveniently heating a dental procedure water bottle includes a sleeve body having a front side separated from a rear side to form an inside. An attachment mechanism is coupled to the sleeve body and is configured to secure the sleeve body around a bottle. A control housing is coupled to the front side of the sleeve body. A temperature sensor is coupled to the rear side of the sleeve body and is configured to read the temperature of the bottle. A temperature display is coupled to the control housing to display a reading from the temperature sensor. A plurality of controls is coupled to the control housing and activates a heating element coupled within the inside of the sleeve body to maintain the temperature of the bottle at a preset level.

9 Claims, 4 Drawing Sheets

(56) References Cited

U.S. PATENT DOCUMENTS

| | | | |
|---|---|---|---|
| 2016/0037966 A1* | 2/2016 | Chin | A47J 37/0682 |
| | | | 99/333 |
| 2019/0104571 A1* | 4/2019 | Clark | A47J 36/321 |
| 2019/0167034 A1* | 6/2019 | Walsh | A47J 36/2483 |
| 2019/0168946 A1* | 6/2019 | Walsh | A47J 36/2483 |
| 2019/0285338 A1* | 9/2019 | Chintala | F25D 31/005 |
| 2020/0187689 A1* | 6/2020 | Baarman | A47J 41/02 |

\* cited by examiner

BOTTLE SLEEVE WARMER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to water heaters and more particularly pertains to a new water heater for conveniently heating a dental procedure water bottle.

BRIEF SUMMARY OF THE INVENTION

An embodiment of the disclosure meets the needs presented above by generally comprising a sleeve body having a front side, a rear side, a left edge, a right edge, a top edge, and a bottom edge. The front side is separated from the rear side to form an inside. An attachment mechanism is coupled to the sleeve body and comprises a first attachment half coupled to the front side adjacent the left edge and a second attachment half coupled to the rear side adjacent the right edge. The first attachment half is selectively engageable with the second attachment half. The attachment mechanism is configured to secure the sleeve body around a bottle. A heating element is coupled within the inside of the sleeve body. A control housing is coupled to the front side of the sleeve body. A power source is coupled to the control housing and is in operational communication with the heating element. A CPU is coupled to the control housing and is in operational communication with the power source. A temperature sensor is coupled to the rear side of the sleeve body and is in operational communication with the CPU. The temperature sensor is configured to read the temperature of the bottle. A temperature display is coupled to the control housing and is in operational communication with the CPU to display a reading from the temperature sensor. A plurality of controls is coupled to the control housing and is in operational communication with the CPU. The plurality of controls activates the heating element to maintain the temperature of the bottle at a preset level.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
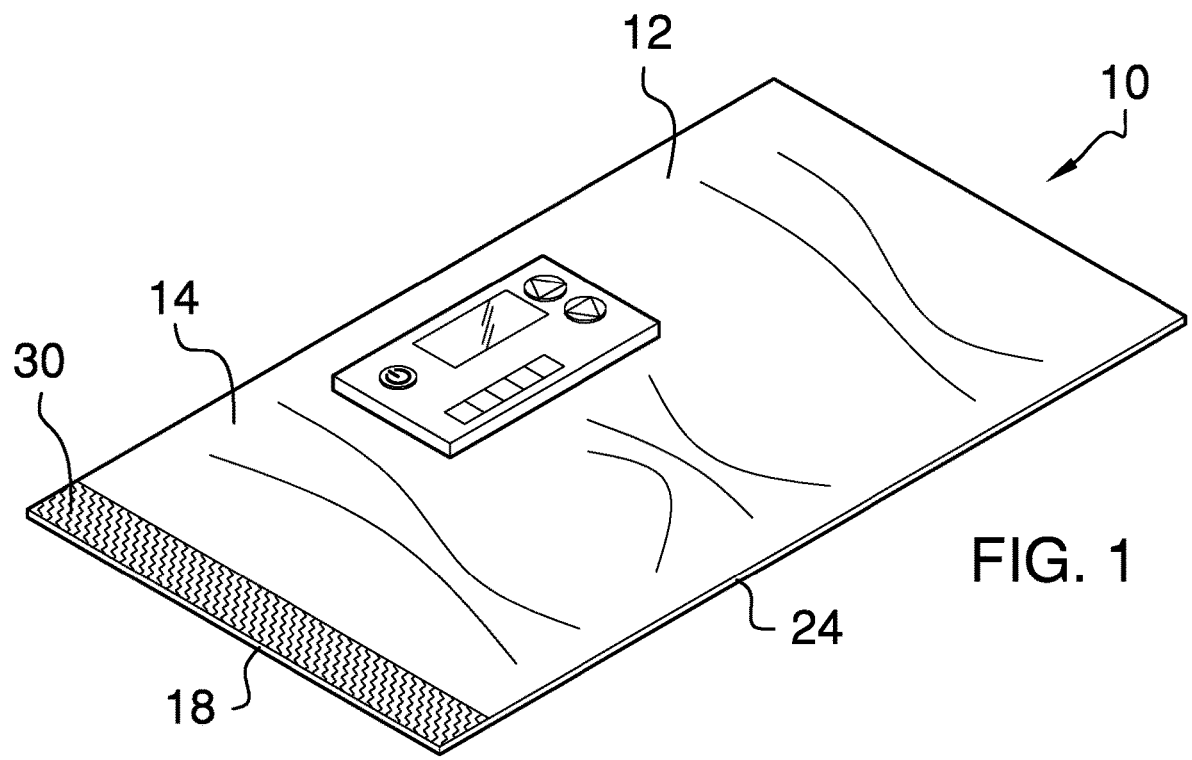
FIG. 1 is an isometric view of a bottle sleeve warmer apparatus according to an embodiment of the disclosure.
Figure 2:
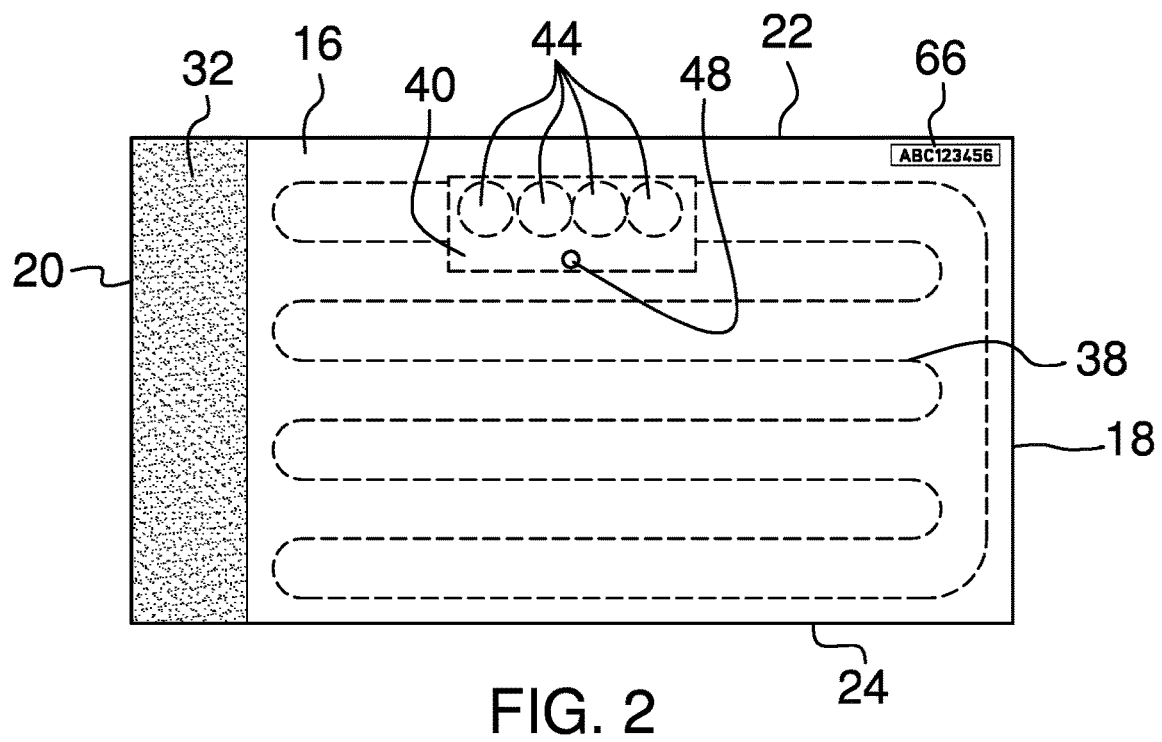
FIG. 2 is a rear elevation view of an embodiment of the disclosure.
Figure 3:
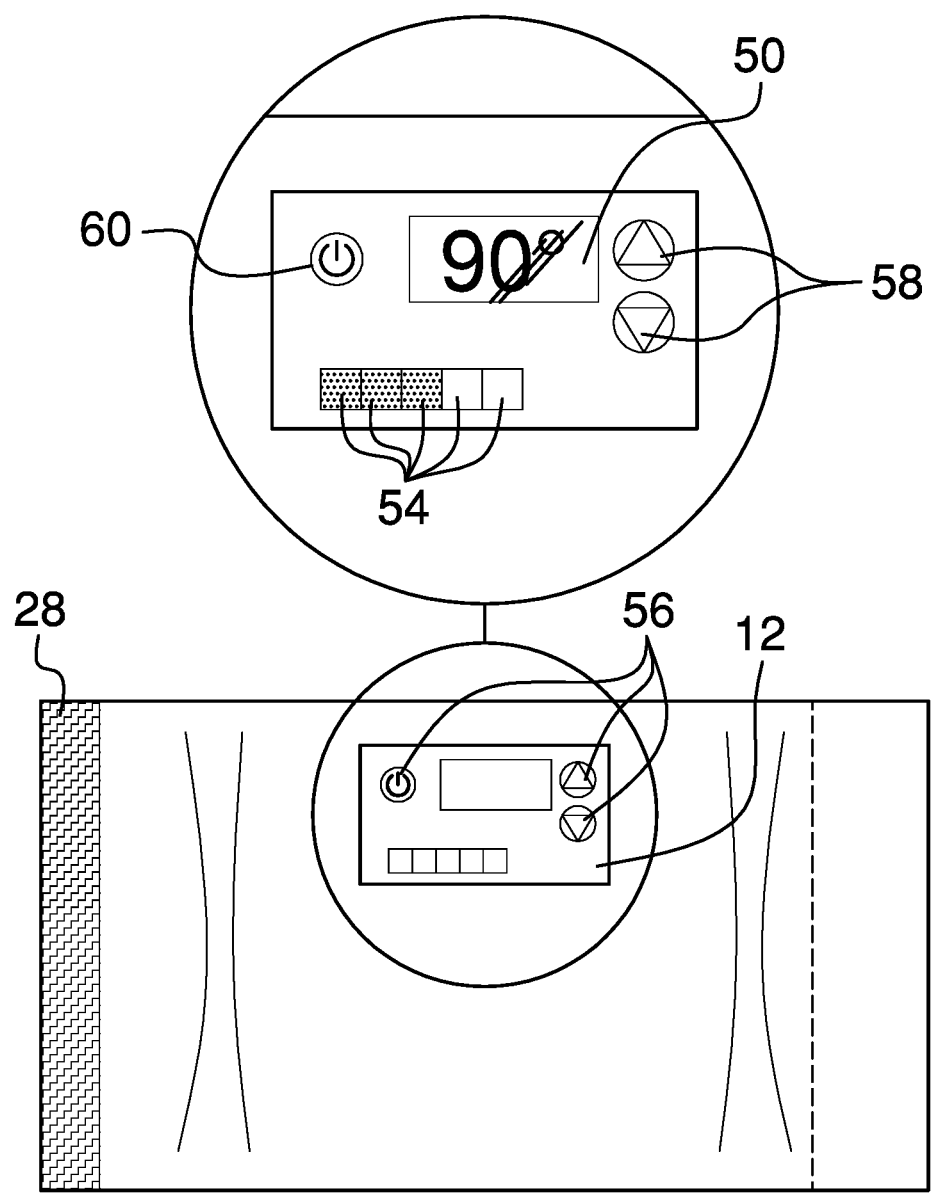
FIG. 3 is a front elevation view of an embodiment of the disclosure.
Figure 4:
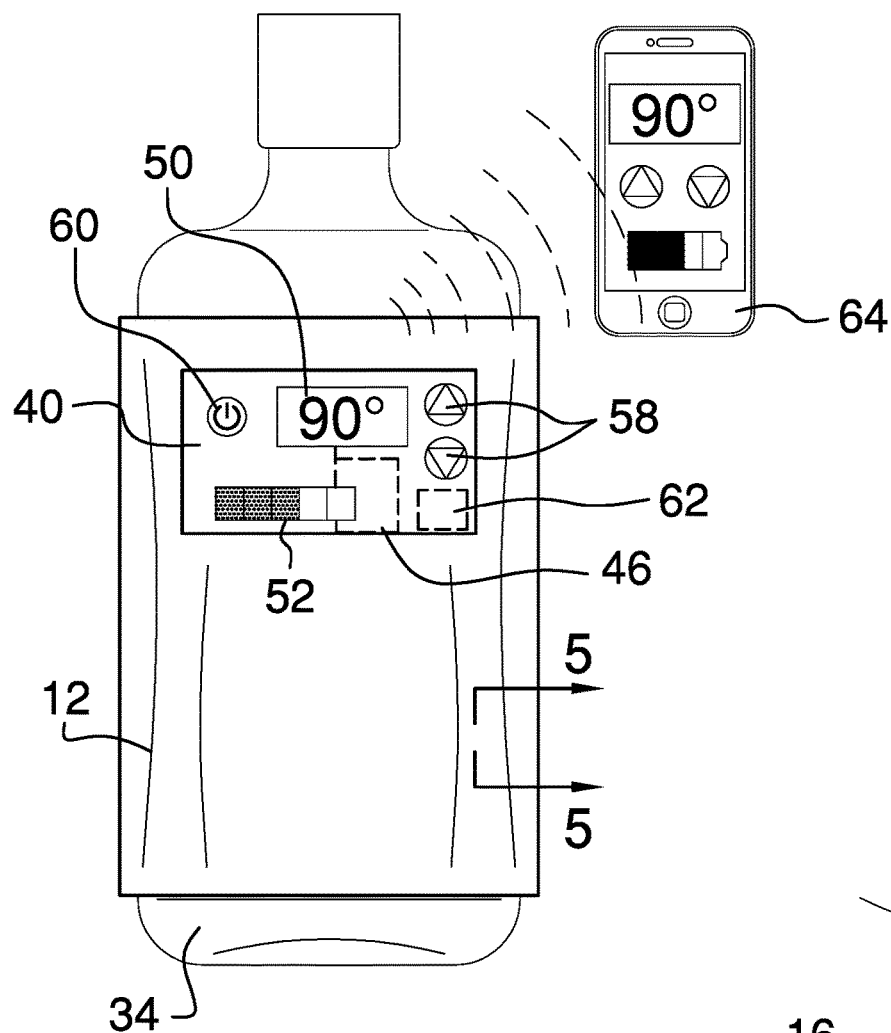
FIG. 4 is an in-use view of an embodiment of the disclosure.
Figure 5:
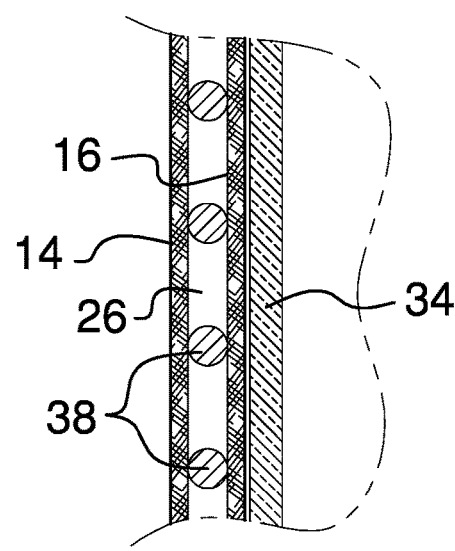
FIG. 5 is a cross-sectional view of an embodiment of the disclosure.
Figure 6:
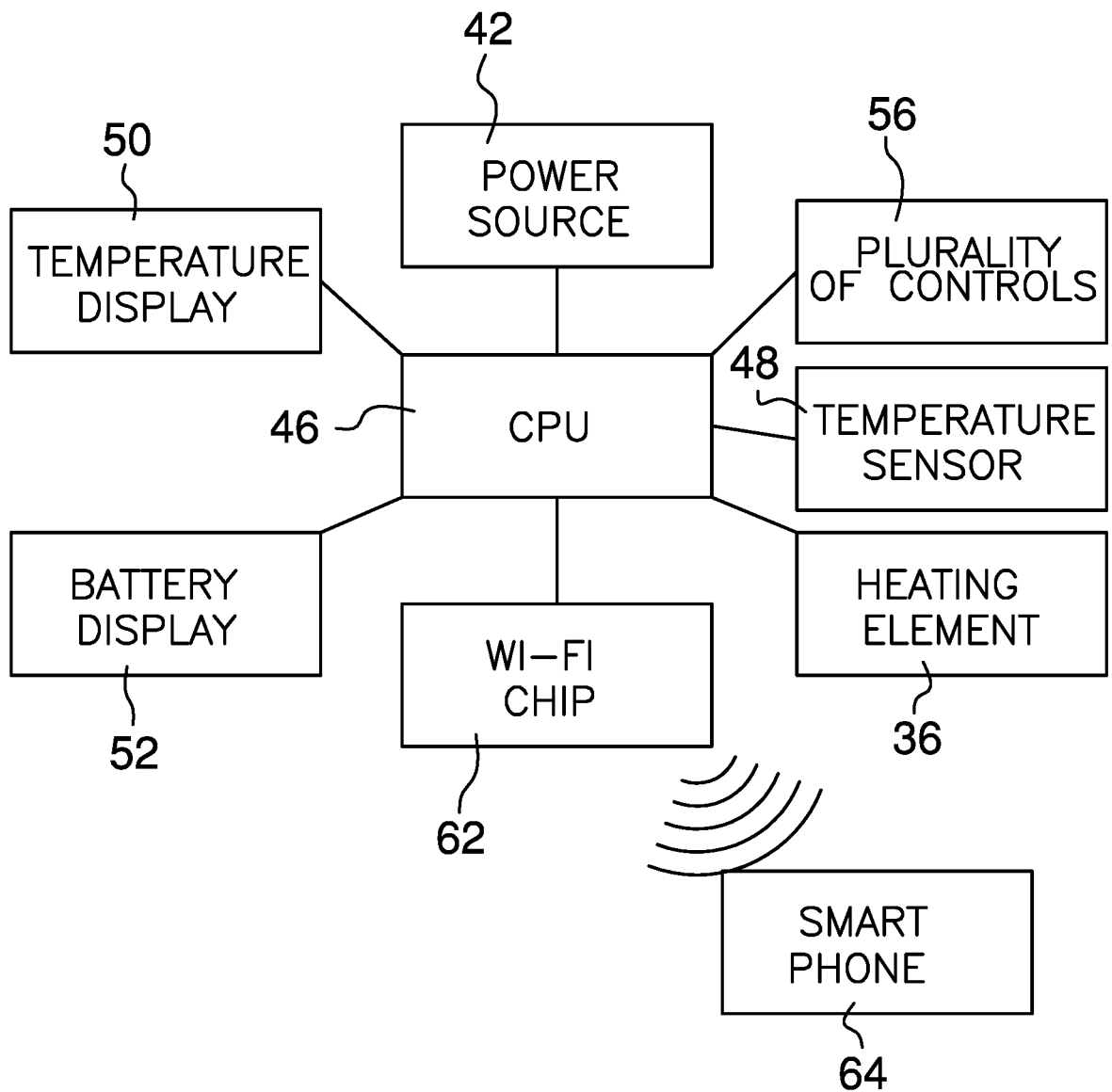
FIG. 6 is a block diagram of an embodiment of the disclosure.

With reference now to the drawings, and in particular to FIGS. 1 through 6 thereof, a new water heater embodying the principles and concepts of an embodiment of the disclosure and generally designated by the reference numeral 10 will be described.

As best illustrated in FIGS. 1 through 6, the bottle sleeve warmer apparatus 10 generally comprises a sleeve body 12 having a front side 14, a rear side 16, a left edge 18, a right edge 20, a top edge 22, and a bottom edge 24. The front side 14 is separated from the rear side 16 to form an inside 26. An attachment mechanism 28 is coupled to the sleeve body 12. The attachment mechanism 28 comprises a first attachment half 30 coupled to the front side 14 adjacent the left edge 18 and a second attachment half 32 coupled to the rear side 16 adjacent the right edge 20. The first attachment half 30 is selectively engageable with the second attachment half 32. The attachment mechanism 28 may be a hook-and-loop fastener. The attachment mechanism 28 is configured to secure the sleeve body 12 around a bottle 34.

A heating element 36 is within the inside 26 of the sleeve body. The heating element 36 may be a continuous heating coil 38. A control housing 40 is coupled to the front side 14 of the sleeve body and may be rectangular prismatic. A power source 42 is coupled to the control housing 40 and is in operational communication with the heating element 36. The power source 42 may be a plurality of batteries 44. A CPU 46 is coupled to the control housing 40 and is in operational communication with the power source 42. A temperature sensor 48 is coupled to the rear side 16 of the sleeve body and is in operational communication with the CPU 46. The temperature sensor 48 is configured to read the temperature of the bottle 34. A temperature display 50 is coupled to the control housing 40 and is in operational communication with the CPU 46 to show a temperature reading from the temperature sensor 48. A battery display 52 may be coupled to the control housing 40 and is in operational communication with the power source 42 to show remaining power level. The battery display 52 may comprise a plurality of illuminating bars 54. A plurality of controls 56 is coupled to the control housing 40 and is in operational communication with the CPU 46. The plurality of controls 56 comprises a pair of temperature controls 58 and a power button 60. The pair of temperature controls 58 increases and alternatively decreases the temperature and the power button 60 activates and alternatively deactivates the heating element and the CPU to maintain the temperature of the bottle 34 at a preset level. A Wi-Fi chip 62 is coupled to the control housing 40 and is in operational communication with the CPU 46. The Wi-Fi chip 62 is configured to make the plurality of controls 56 operable with a web connected app on a smartphone 64. A serial number plate 66 may be coupled to the rear side 16 to assist in pairing the app with the correct unit.

In use, the attachment mechanism 28 is used to secure the sleeve body 12 around the bottle 34 with the rear side 16 contacting the bottle. The plurality of controls 56 is then manipulated directly or via the web connected app to adjust the temperature and warm the bottle 34 to improve patient comfort in a dental procedure.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A bottle sleeve warmer apparatus comprising:
    a sleeve body, the sleeve body having a front side, a rear side, a left edge, a right edge, a top edge, and a bottom edge, the front side being separated from the rear side to form an inside;
    an attachment mechanism coupled to the sleeve body, the attachment mechanism comprising a first attachment half coupled to the front side adjacent the left edge and a second attachment half coupled to the rear side adjacent the right edge, the first attachment half being selectively engageable with the second attachment half, the attachment mechanism being configured to secure the sleeve body around a bottle;
    a heating element coupled to the sleeve body, the heating element being coupled within the inside;
    a control housing coupled to the sleeve body, the control housing being coupled to the front side;
    a power source coupled to the control housing, the power source being in operational communication with the heating element;
    a CPU coupled to the control housing, the CPU being in operational communication with the power source;
    a temperature sensor coupled to the sleeve body, the temperature sensor being coupled to the rear side, the temperature sensor being in operational communication with the CPU, the temperature sensor being configured to read the temperature of the bottle;
    a temperature display coupled to the control housing, the temperature display being in operational communication with the CPU;
    a plurality of controls coupled to the control housing, the plurality of controls being in operational communication with the CPU, the plurality of controls activating and alternately deactivating the heating element to maintain the temperature of the bottle at a preset level;
    a Wi-Fi chip coupled to the control housing, the Wi-Fi chip being in operational communication with the CPU, the Wi-Fi chip being configured to make the plurality of controls operable with a web connected app; and
    a serial number plate, the serial number plate having a serial number thereon, the serial number being required for operational communication with the CPU by the web connected app, the serial number plate being positioned on the rear side of the sleeve body adjacent to the left edge wherein the serial number plate is positioned to face the bottle when the sleeve body is secured to the bottle.

2. The bottle sleeve warmer apparatus of claim 1 further comprising the plurality of controls comprising a pair of temperature controls and a power button, the pair of temperature controls increasing and alternately decreasing the temperature, the power button activating and alternatively deactivating the heating element and the CPU.

3. The bottle sleeve warmer apparatus of claim 1 further comprising a battery display coupled to the control housing, the battery display being in operational communication with the power source to show remaining power level.

4. The bottle sleeve warmer apparatus of claim 3 further comprising the battery display comprising a plurality of illuminating bars.

5. The bottle sleeve warmer apparatus of claim 1 further comprising the control housing being rectangular prismatic.

6. The bottle sleeve warmer apparatus of claim 1 further comprising the heating element being a continuous heating coil.

7. The bottle sleeve warmer apparatus of claim 1 further comprising the power source being a plurality of batteries.

8. The bottle sleeve warmer apparatus of claim 1 further comprising the attachment mechanism being a hook-and-loop fastener.

9. A bottle sleeve warmer apparatus comprising:
    a sleeve body, the sleeve body having a front side, a rear side, a left edge, a right edge, a top edge, and a bottom edge, the front side being separated from the rear side to form an inside;
    an attachment mechanism coupled to the sleeve body, the attachment mechanism comprising a first attachment half coupled to the front side adjacent the left edge and a second attachment half coupled to the rear side adjacent the right edge, the first attachment half being selectively engageable with the second attachment half, the attachment mechanism being a hook-and-loop fastener, the attachment mechanism being configured to secure the sleeve body around a bottle;

a heating element coupled to the sleeve body, the heating element being coupled within the inside, the heating element being a continuous heating coil;

a control housing coupled to the sleeve body, the control housing being coupled to the front side, the control housing being rectangular prismatic;

a power source coupled to the control housing, the power source being in operational communication with the heating element, the power source being a plurality of batteries;

a CPU coupled to the control housing, the CPU being in operational communication with the power source;

a temperature sensor coupled to the sleeve body, the temperature sensor being coupled to the rear side, the temperature sensor being in operational communication with the CPU, the temperature sensor being configured to read the temperature of the bottle;

a temperature display coupled to the control housing, the temperature display being in operational communication with the CPU;

a battery display coupled to the control housing, the battery display being in operational communication with the power source to show remaining power level, the battery display comprising a plurality of illuminating bars;

a plurality of controls coupled to the control housing, the plurality of controls being in operational communication with the CPU, the plurality of controls comprising a pair of temperature controls and a power button, the pair of temperature controls increasing and alternately decreasing the temperature, the power button activating and alternately deactivating the heating element and the CPU to maintain the temperature of the bottle at a preset level;

a Wi-Fi chip coupled to the control housing, the Wi-Fi chip being in operational communication with the CPU, the Wi-Fi chip being configured to make the plurality of controls operable with a web connected app; and a serial number plate, the serial number plate having a serial number thereon, the serial number being required for operational communication with the CPU by the web connected app, the serial number plate being positioned on the rear side of the sleeve body adjacent to the left edge wherein the serial number plate is positioned to face the bottle when the sleeve body is secured to the bottle.

\* \* \* \* \*